United States Patent
Prasad et al.

(10) Patent No.: US 10,026,321 B2
(45) Date of Patent: Jul. 17, 2018

(54) AUTOMATED VEHICLE CROSS-TRAFFIC DETECTION SYSTEM

(71) Applicant: DELPHI TECHNOLOGIES, INC., Troy, MI (US)

(72) Inventors: Premchand Krishna Prasad, Carmel, IN (US); Liang Ma, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/339,175

(22) Filed: Oct. 31, 2016

(65) Prior Publication Data

US 2018/0122243 A1  May 3, 2018

(51) Int. Cl.
 *G08G 1/16* (2006.01)
 *B60T 7/22* (2006.01)

(52) U.S. Cl.
 CPC .............. *G08G 1/167* (2013.01); *B60T 7/22* (2013.01); *G08G 1/166* (2013.01)

(58) Field of Classification Search
 None
 See application file for complete search history.

(56) References Cited

U.S. PATENT DOCUMENTS

| 8,306,747 | B1* | 11/2012 | Gagarin | G01C 7/04 |
| | | | | 701/408 |
| 8,700,305 | B2* | 4/2014 | Hayakawa | B60T 7/22 |
| | | | | 701/301 |
| 2011/0313665 | A1* | 12/2011 | Lueke | G01S 13/931 |
| | | | | 701/301 |
| 2015/0266455 | A1 | 9/2015 | Wilson | |
| 2016/0140847 | A1 | 5/2016 | Kawamata et al. | |

* cited by examiner

*Primary Examiner* — Rami Khatib
(74) *Attorney, Agent, or Firm* — Lawrence D. Hazelton

(57) ABSTRACT

A cross traffic detection system suitable for use on an automated vehicle includes an object-detector, an alert-device, and a controller. The object detector is used to determine locations of moving objects relative to a host vehicle. The alert device is used to alert an operator of the host vehicle to the location of the moving objects. The controller is in communication with the object detector and the alert device. The controller determines a first trail of a first moving object based on the locations of the first moving object, and determines a road model based on a polynomial of the first trail. The controller also determines a second trail of a second moving object, assigns a lane number to the second moving object based on the road model, and activates the alert device when the path of the second moving object resides in the lane-number overlain by a conflict zone.

4 Claims, 5 Drawing Sheets

AUTOMATED VEHICLE CROSS-TRAFFIC DETECTION SYSTEM

TECHNICAL FIELD OF INVENTION

This disclosure generally relates to a cross-traffic detection system suitable for use on an automated vehicle, and more particularly relates to a system that determines a trail of a moving-object.

BACKGROUND OF INVENTION

Cross-traffic alert systems that notify an operator when an approaching vehicle is predicted to pass behind the host-vehicle are known. The prediction can be difficult when, for example, initial heading estimates might be erroneous, and/or the road may be curved. It has been observed that vehicles that are headed for the alert region may appear to be headed away until the last moment, leading to late alerts.

SUMMARY OF THE INVENTION

In accordance with one embodiment, a cross-traffic detection system suitable for use on an automated vehicle is provided. The system includes an object-detector, an alert-device, and a controller. The object-detector is used to determine locations of moving-objects relative to a host-vehicle. Each of the locations is indicated by a lateral-distance and a longitudinal-distance of the moving-objects from the host-vehicle. The alert-device is used to alert an operator of the host-vehicle to the location of the moving-objects. The controller is in communication with the object-detector and the alert-device. The controller determines a clearance from the host-vehicle to a lane-edge. The controller also determines a first-trail of a first-moving-object based on the locations of the first-moving-object, and determines a road-model based on the clearance and a polynomial of the first-trail. The controller also determines a second-trail of a second-moving-object and assigns a lane-number to the second-moving-object based on the road-model and the clearance. The controller also activates the alert-device when a path of the second-moving-object resides in the lane-number overlain by a conflict-zone of the host-vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
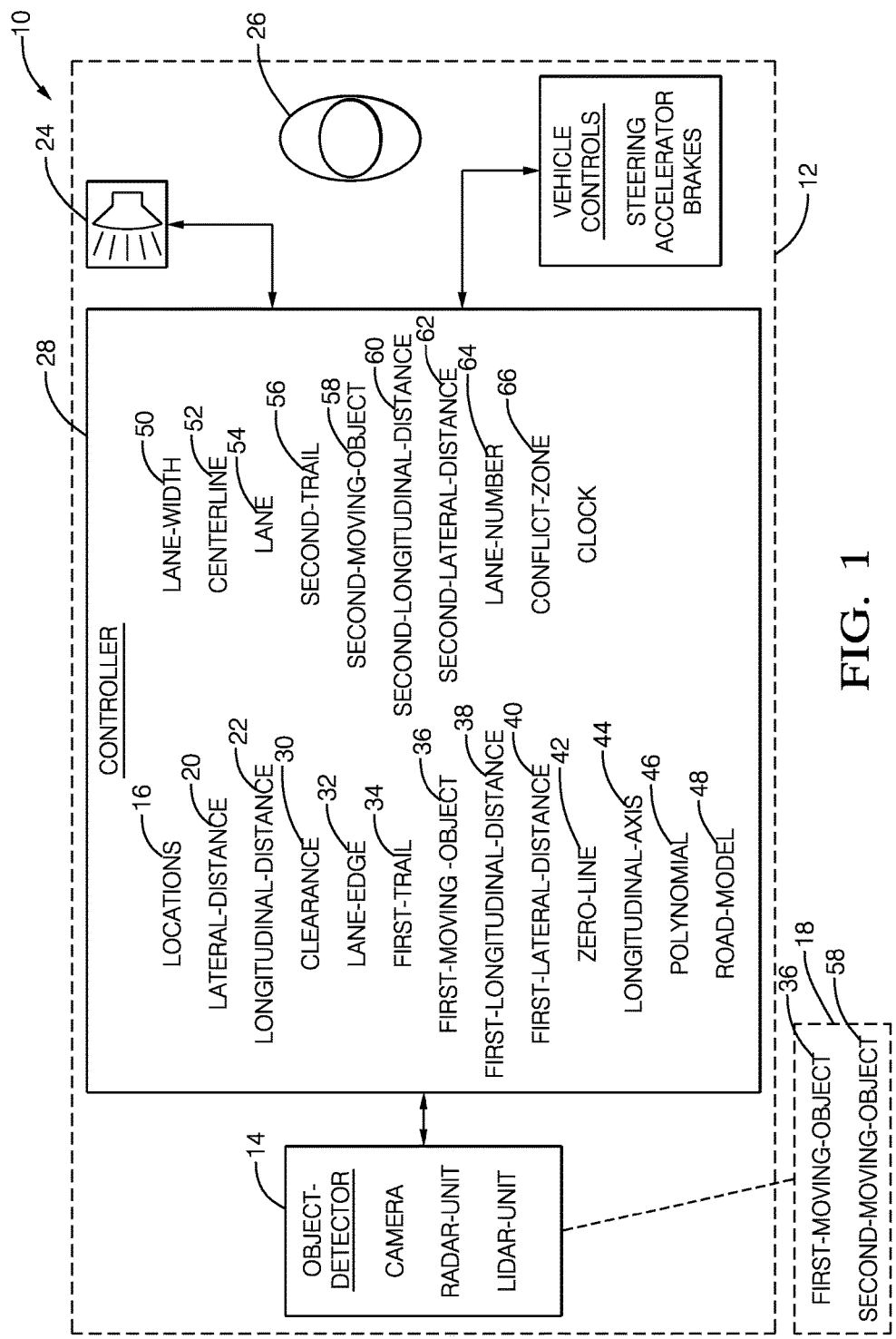
FIG. 1 is diagram of a cross-traffic detection system in accordance with one embodiment.

FIG. 1 illustrates a non-limiting example of a cross-traffic detection system 10, hereafter referred to as the system 10, which is suitable for use on an automated vehicle, for example a host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing a cross-traffic alert to the human, and possibly operating the brakes of the host-vehicle 12 to prevent the host-vehicle 12 from entering a travel-path of an approaching vehicle.

As used herein, the term 'cross-traffic' is generally used to refer to instances where the host-vehicle 12 is attempting to enter a roadway, but the presence of cross-traffic present on the roadway requires the host-vehicle 12 to wait until the cross-traffic passes so the roadway can be safely entered. Known cross-traffic alert systems are often associated with situations when a vehicle is attempting to back out of a driveway onto a roadway, but it is contemplated that the system 10 described herein will also be useful when the host-vehicle 12 is traveling in a forward direction. As will be recognized by those in the art, a cross-traffic detection system 10 is particularly useful when the human's view of a roadway is blocked by, for example, shrubs, bushes, or other land-scape features.

The system 10 includes an object-detector 14 used to determine the locations 16 of moving-objects 18 that are moving proximate to and/or relative to the host-vehicle 12. While the non-limiting examples presented herein are generally directed to instances when the moving-objects 18 are another vehicle (e.g. another automobile) approaching the host-vehicle 12, it is contemplated that the moving-objects 18 may be, for example, a pedestrian who is walking, skateboarding, or bicycling and moving relative to the host-vehicle 12. By way of example and not limitation, the object-detector 14 may be a camera, lidar-unit, a radar-unit, a combination thereof, or any type of detector useable to detect the presence and relative-location of the moving-objects 18. Devices with inherent ranging capabilities such as the radar-unit or lidar-unit are considered to be preferable choices as those devices are particularly useful to determine a range and direction from the host-vehicle 12 to the locations 16 of an instance of the moving-objects 18.

Figure 2:
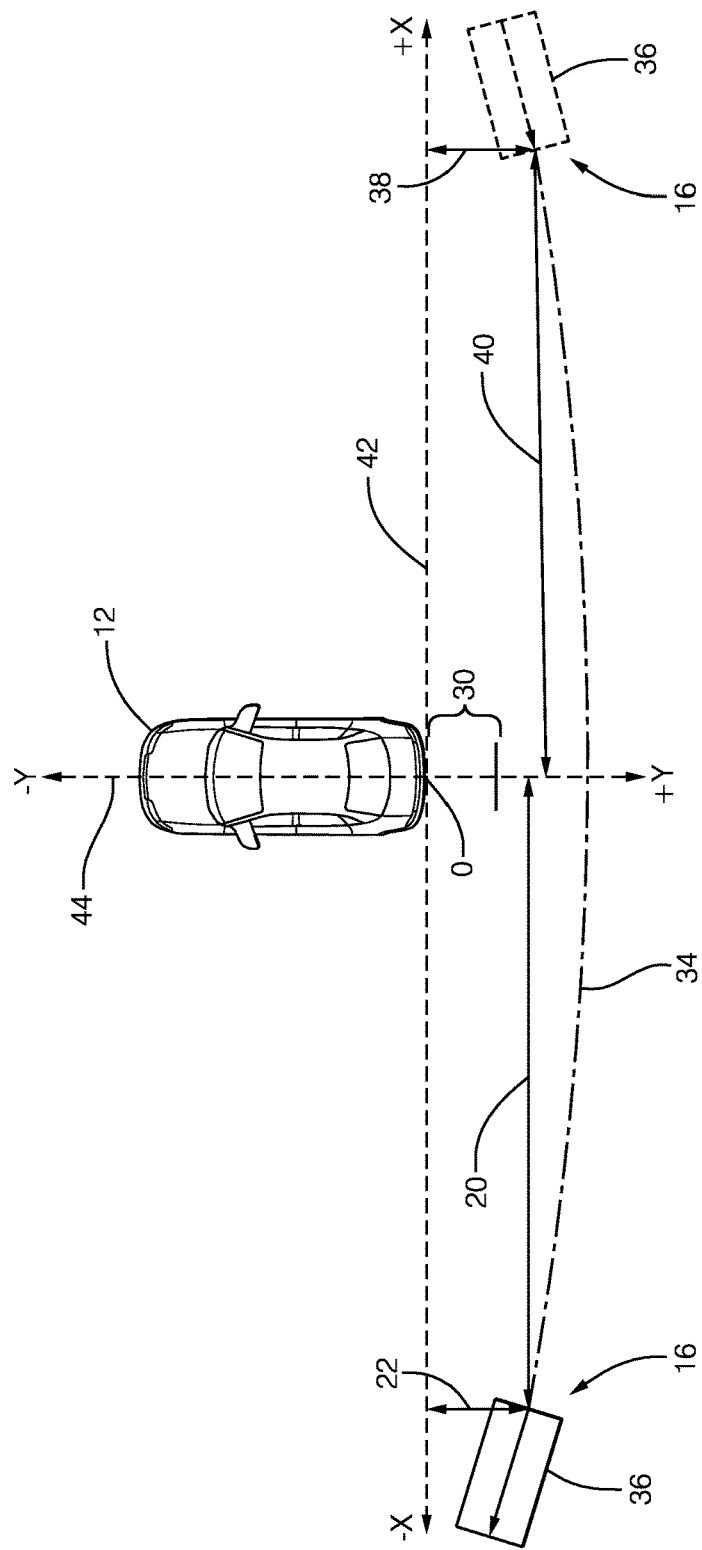
FIG. 2 is an illustration of a first-moving-object in accordance with one embodiment.

As will become apparent in the description that follows, it will be convenient if the locations 16 are indicated or represented in Cartesian-coordinates by a lateral-distance 20 (i.e. distance measured leftward/rightward relative to the host-vehicle 12) and a longitudinal-distance 22 (i.e. distance measured forward/backward relative to the host-vehicle 12) of the moving-objects 18 from or relative to the host-vehicle 12 (FIG. 2). Typically, a radar-unit or a lidar-unit will provide data in polar-coordinates (e.g. direction and range to a target) so some processing is required to convert or translate polar-coordinates into Cartesian-coordinates, the process for doing so being well-known to those in the art. The controller 28 may be configured or programmed to convert the polar-coordinate data typically provided from a radar-unit or lidar-unit into Cartesian-coordinates.

The system 10 also includes an alert-device 24 that alerts an operator 26 of the host-vehicle 12 to the locations 16 of the moving-objects 18. The alert-device 24 may be an indicator viewable by the operator 26 that is illuminated to indicate close proximity of an instance of the moving-objects 18, and/or an audible alarm that is activated to indicate the same. The alert-device 24 includes known illuminated indicators, such as those present in side-view mirrors, to indicate the presence and relative-location of the moving-objects 18 detected by the object-detector 14, as will be recognized by those familiar with well-known automobile-operator notification devices and techniques. For example, the operator 26 that is attempting to back the host-vehicle 12 out of the driveway onto the roadway when cross-traffic is approaching from a right-hand side of the host-vehicle 12 is notified by the illuminated indicators on the right-hand side-view mirror. The operator 26 may also be alerted to the presence of the approaching cross-traffic by the audible alarm.

The system 10 also includes a controller 28 in communication with the object-detector 14 and the alert-device 24. The controller 28 may determine a clearance 30 from the host-vehicle 12 to a lane-edge 32 by assuming a one-meter (1-meter) distance to the lane-edge 32 for example, or by using any of the edge-detection strategies known to one skilled in the art. The controller 28 may also determine a first-trail 34 of a first-moving-object 36 based on the locations 16 of the first-moving-object 36.

The controller 28 may include a processor (not specifically shown) such as a microprocessor or other control circuitry such as analog and/or digital control circuitry including an application specific integrated circuit (ASIC) for processing data as should be evident to those in the art. The controller 28 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the moving-objects 18 are going to cross the intended path of the host-vehicle 12 (i.e. the moving-objects 18 are or are predicted to become an instance of cross-traffic) based on signals received by the controller 28 from the object-detector 14 as described herein.

In order for the system 10 to determine a first-trail 34 of a first-moving-object 36, the controller 28 may be configured to accumulate (i.e. record and store) a plurality of first-longitudinal-distances 38 of the first-moving-object 36 at a plurality of first-lateral-distances 40 (i.e. the locations 16) as illustrated in FIG. 2. That is, as an instance of the first-moving-object 36 moves toward and away from the host-vehicle 12, the longitudinal-distance 22 (how far forward or rearward the first-moving-object 36 is relative to a zero-line 42 perpendicular to a longitudinal-axis 44 of the host-vehicle 12) and the lateral-distance 20 is accumulated (i.e. recorded and stored). The controller 28 may accumulate any amount of locations 16 of the first-moving-object 36 sufficient to determine a polynomial 46 of the first-trail 34. Experimentation indicates that sixty (60) locations 16 (e.g. thirty locations 16 of the approaching first-moving-object 36 and thirty locations 16 of the departing first-moving-object 36) are sufficient to determine the polynomial 46, with each location 16 being accumulated at a rate of between thirty milliseconds (30 ms) and fifty milliseconds (50 ms). The controller 28 may use any of the known methods for determining the polynomial 46, including, but not limited to, a least-squares-method and an interpolation-method, as will be apparent to one skilled in the art.

Figure 3:
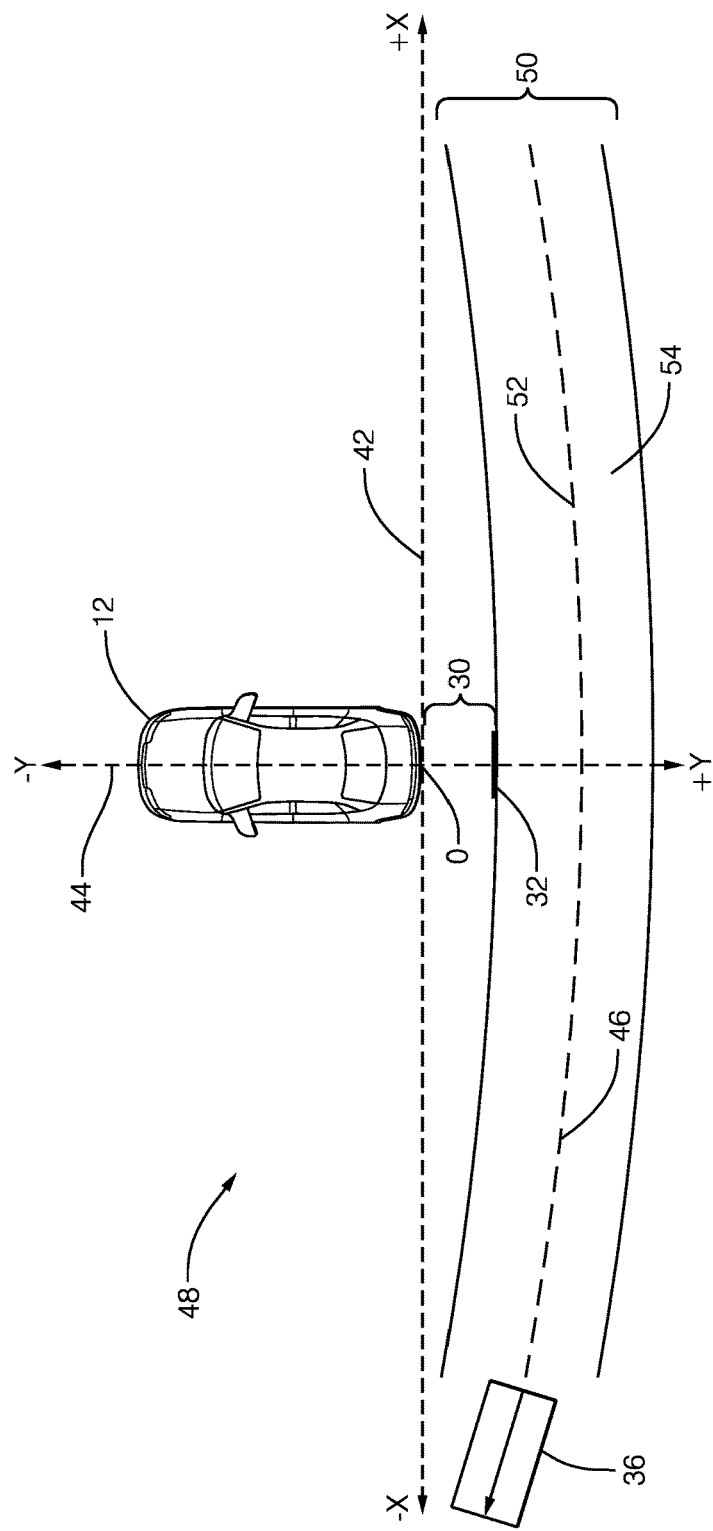
FIG. 3 is an illustration of a road-model in accordance with one embodiment.

The controller 28 may also be configured to determine a road-model 48 based on the polynomial 46 of the first-trail 34 and the clearance 30 from the host-vehicle 12 to the lane-edge 32 as illustrated in FIG. 3. The road-model 48 may be constructed by the controller 28 by assuming a lane-width 50 of 3.5 meters, for example, if the lane-width 50 is not available from another source, such as a digital-map or a crowd-sourcing input. The clearance 30 defines the lane-edge 32 and the polynomial 46 defines a centerline 52 of a lane 54 of the road-model 48. The controller 28 may also take into account the speed (not shown) of the host-vehicle 12 and/or the yaw-rate (not shown) of the host-vehicle 12 when constructing the road-model 48 and orients a tangent (not shown) of the polynomial 46 to be normal to the longitudinal-axis 44 of the host-vehicle 12.

Figure 4:
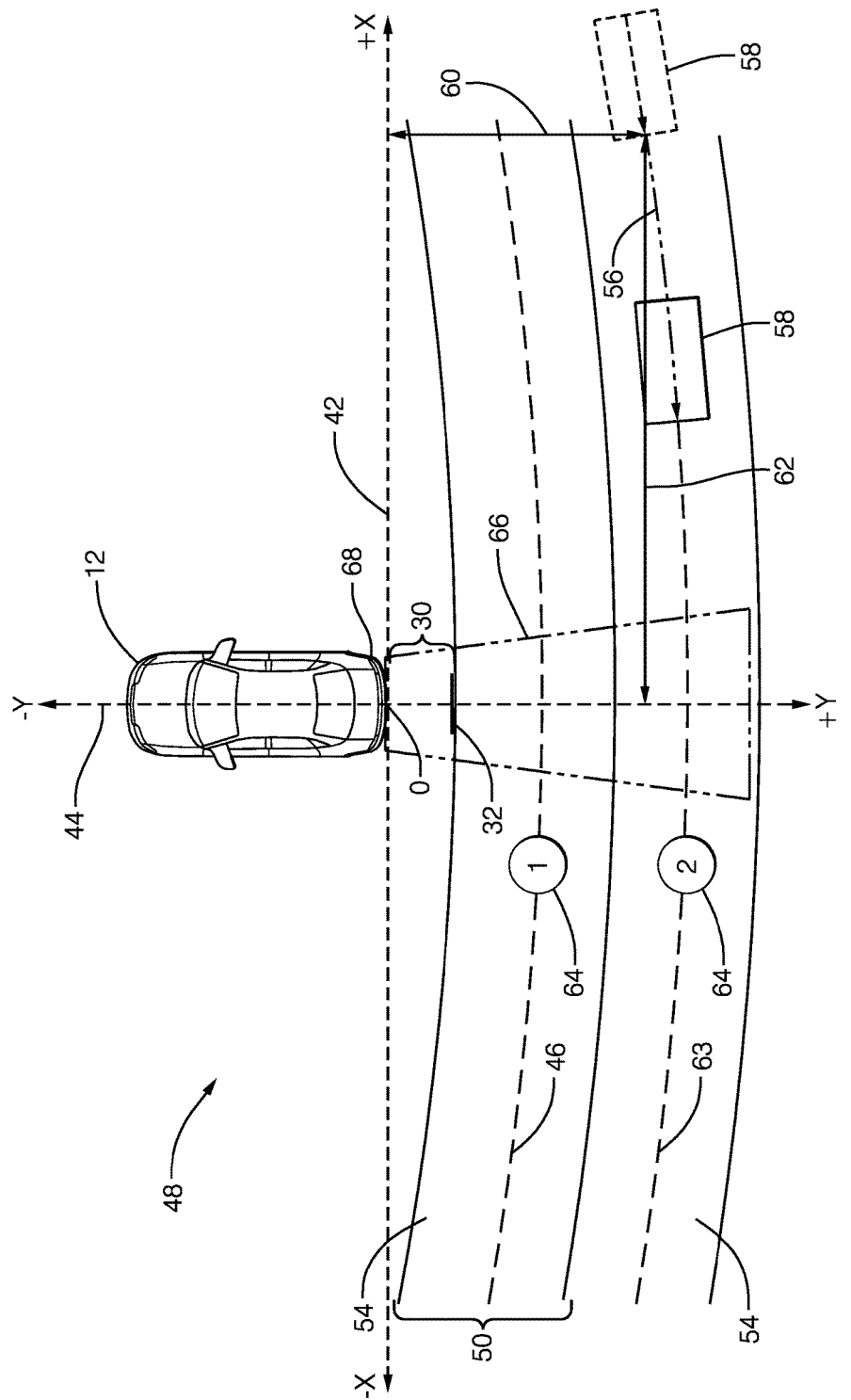
FIG. 4 is an illustration of a second-moving-object in accordance with one embodiment.

Once the road-model 48 is constructed by the controller 28, the controller 28 is able to determine a second-trail 56 of a second-moving-object 58 as illustrated in FIG. 4. The locations 16 of the second-moving-object 58 may be indicated by a second-longitudinal-distance 60 and a second-lateral-distance 62 when the second-moving-object 58 is initially detected. Alternatively, the second-moving-object 58 may be tracked until some confidence-level is achieved that indicates what is being tracked is indeed a moving-object 18. The road-model 48 may be updated by the controller 28 based on a second-polynomial 63 (FIG. 4) of the second-trail 56. The controller 28 may assign the second-moving-object 58 a lane-number 64 based on the road-model 48, the clearance 30 of the host-vehicle 12 to the lane-edge 32, and the second-longitudinal-distance 60 of the second-moving-object 58. In the non-limiting example illustrated in FIG. 4, the second-moving-object 58 is traveling in a same direction as the first-moving-object 36 from FIG. 3, and the second-longitudinal-distance 60 is indicative of the second-moving-object 58 traveling in another lane 54, different from the lane 54 of the first-moving-object 36. The controller 28 assigns the second-moving-object 58 the lane-number 64 "TWO" (2) because the second-longitudinal-distance 60 is indicative of the second-moving-object 58 traveling in a lane 54 adjacent to the lane 54 of the first-moving-object 36. Similarly, the controller 28 may assign another moving-object 18 the lane-number 64 "THREE" (3) if the second-longitudinal-distance 60 is indicative of the second-moving-object 58 traveling in a third lane 54, based on the road-model 48. The controller 28 is configured to assign the lane-number 64 to the moving-objects 18 regardless of the direction of travel of the moving-objects 18.

Figure 5:
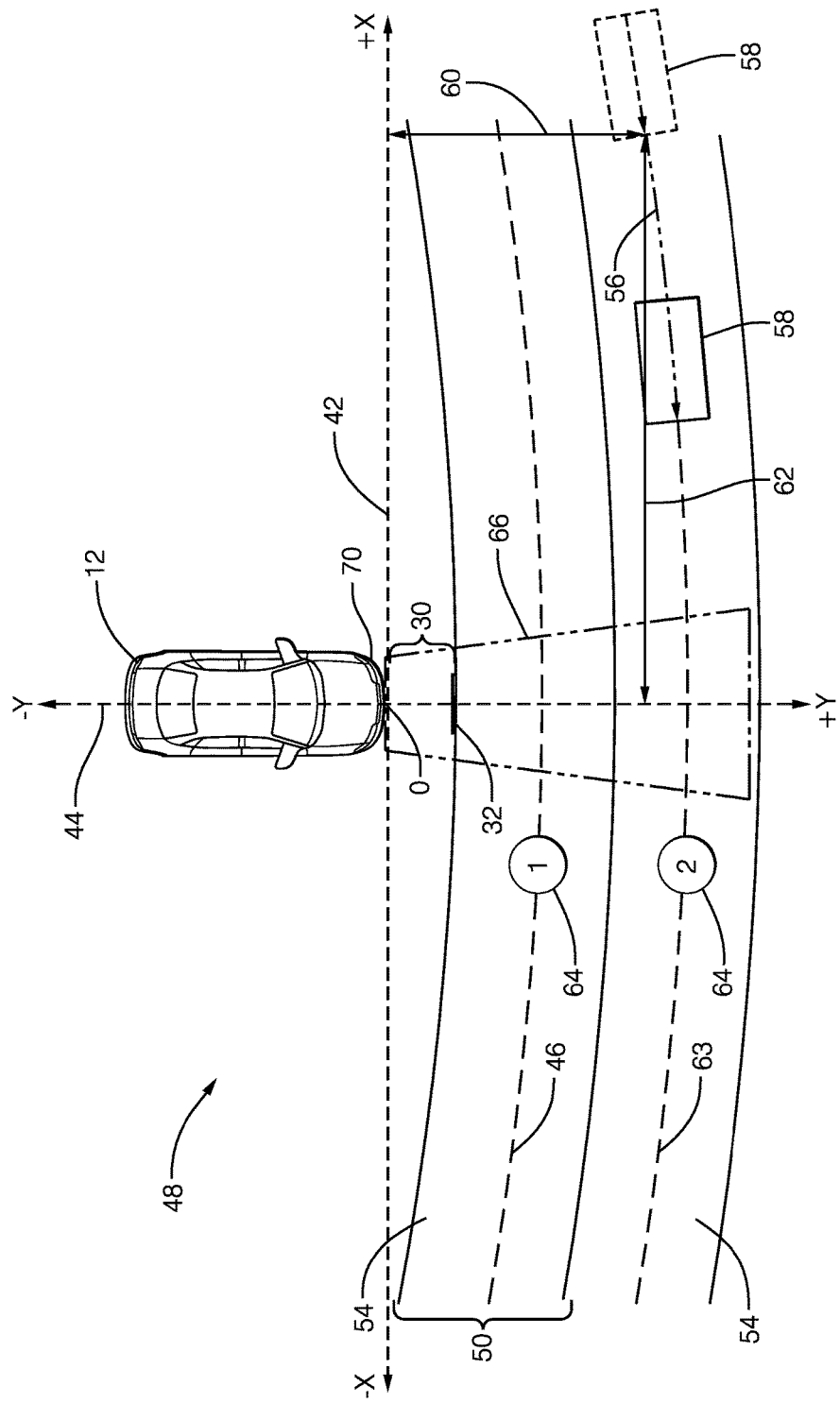
FIG. 5 is an illustration of a second-moving-object in accordance with one embodiment.

The controller 28 is further configured to establish a conflict-zone 66 that projects from the host-vehicle 12 over a portion of the lanes 54 that are defined by the road-model 48. The conflict-zone 66 may project from a back-end 68 of the host-vehicle 12 (FIG. 4), or may project from a front-end 70 of the host-vehicle 12 (FIG. 5). The conflict-zone 66 is a sub-set of a larger sensing-boundary (not shown) that is established by the object-detector 14, and defines an area proximate to the host-vehicle 12 where a time-to-collision (TTC) between the host-vehicle 12 and the moving-objects 18, as calculated by the controller 28 using the signals from the object-detector 14, may be less than a predetermined threshold. The TTC may be any time-duration set by the user. Experimentation has indicated that a TTC of 2.5 seconds provides the operator 26 with sufficient warning to control the host-vehicle 12 to prevent a collision. The conflict-zone 66 may project over any number of lanes 54, and typically projects over one lane 54. FIGS. 4 and 5 illustrate the conflict-zone 66 projecting (i.e. overlaying) across two lanes 54 to more clearly illustrate the function of the alert-device 24. The controller 28 may activate the alert-device 24 when a path of the second-moving-object 58 resides in any lane-number 64 overlain by the conflict-zone 66 when the TTC is determined by the controller 28 to be less than 2.5 seconds.

Accordingly, a cross-traffic detection system 10 (the system 10), an alert-device 24, and a controller 28 for the system 10 is provided. Assigning a lane-number 64 to the moving-objects 18 provides for a simple method to determine if the path of the moving-objects 18 reside in the lane-number 64 overlain by the conflict-zone 66, so that if the second-moving-object 58 is going to pass too close to or collide with the host-vehicle 12, the system 10 can take appropriate action. The appropriate action may include activating the alert-device 24 (audible and/or visible) detectable by the operator 26, or automatically applying the brakes of the host-vehicle 12, or even autonomously operating the vehicle-controls of the host-vehicle 12 to move the host-vehicle 12 in a manner effective to prevent a collision.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Furthermore, the use of the terms a, an, etc. do not denote a limitation of quantity, but rather denote the presence of at least one of the referenced items.

We claim:

1. A cross-traffic detection system suitable for use on an automated vehicle, said system comprising:
   an object-detector that determines locations of moving-objects relative to a host-vehicle, each of said locations indicated by a lateral-distance and a longitudinal-distance of the moving-objects from the host-vehicle;
   an alert-device that alerts an operator of the host-vehicle to the locations of the moving-objects; and
   a controller in communication with the object-detector and the alert-device, wherein the controller determines a clearance from the host-vehicle to a lane-edge of a roadway traveled by cross-traffic, determines a first-trail of a first-moving-object based on the locations of the first-moving-object, determines a road-model based on the clearance and a polynomial of the first-trail, determines a second-trail of a second-moving-object, assigns a lane-number to the second-moving-object based on the road-model and the clearance, and activates the alert-device when a path of the second-moving-object resides in the lane-number overlain by a conflict-zone of the host-vehicle, said conflict-zone defining an area proximate to the host-vehicle where a time-to-collision between the host-vehicle and the moving-objects is less than a predetermined threshold.

2. The system in accordance with claim 1, wherein the conflict-zone extends from a back-end of the host-vehicle.

3. The system in accordance with claim 1, wherein the conflict-zone extends from a front-end of the host-vehicle.

4. The system in accordance with claim 1, wherein the road-model is further updated based on the clearance and a second-polynomial of the second-trail.

* * * * *